United States Patent

Woodward

[15] 3,659,780
[45] May 2, 1972

[54] ELECTRIC ODOMETER DRIVE

[72] Inventor: Gary Floyd Woodward, Ann Arbor, Mich.

[73] Assignee: Ford Motor Company, Dearborn, Mich.

[22] Filed: Nov. 30, 1970

[21] Appl. No.: 93,598

[52] U.S. Cl. ............................................ 235/95 R, 324/167
[51] Int. Cl. ....................................................... G01c 22/00
[58] Field of Search ............................. 235/95, 96; 324/167

[56] References Cited

UNITED STATES PATENTS

| | | | |
|---|---|---|---|
| 1,055,911 | 3/1913 | Hopkins | 324/167 |
| 1,364,673 | 1/1921 | Wood | 324/167 |
| 2,339,743 | 1/1944 | Norman | 324/167 |
| 3,166,245 | 1/1965 | Maschke | 235/95 |
| 3,309,609 | 3/1967 | Brewer et al. | 324/167 |

FOREIGN PATENTS OR APPLICATIONS

| | | | |
|---|---|---|---|
| 637,974 | 11/1936 | Germany | 324/167 |
| 1,269,399 | 6/1961 | Germany | 324/167 |
| 597,579 | 1/1948 | Great Britain | 324/167 |

*Primary Examiner*—Richard R. Wilkinson
*Assistant Examiner*—Stanley A. Wal
*Attorney*—John R. Faulkner and Keith L. Zerschling

[57] ABSTRACT

An electrically operated odometer including an electric motor, a plurality of odometer rolls and reduction gearing preferably in the form of series connected worm and worm gear sets coupling the electric motor to the odometer rolls. A plastic housing completely encloses the electric motor and the reduction gears with the housing being positioned in spaced relationship to the electric motor. The electric motor is alternately energized and de-energized by suitable switching arrangements to drive the odometer rolls, and the reduction gearing provides high torque and minimum overrun on the odometer rolls.

5 Claims, 7 Drawing Figures

Patented May 2, 1972
3,659,780
3 Sheets-Sheet 1
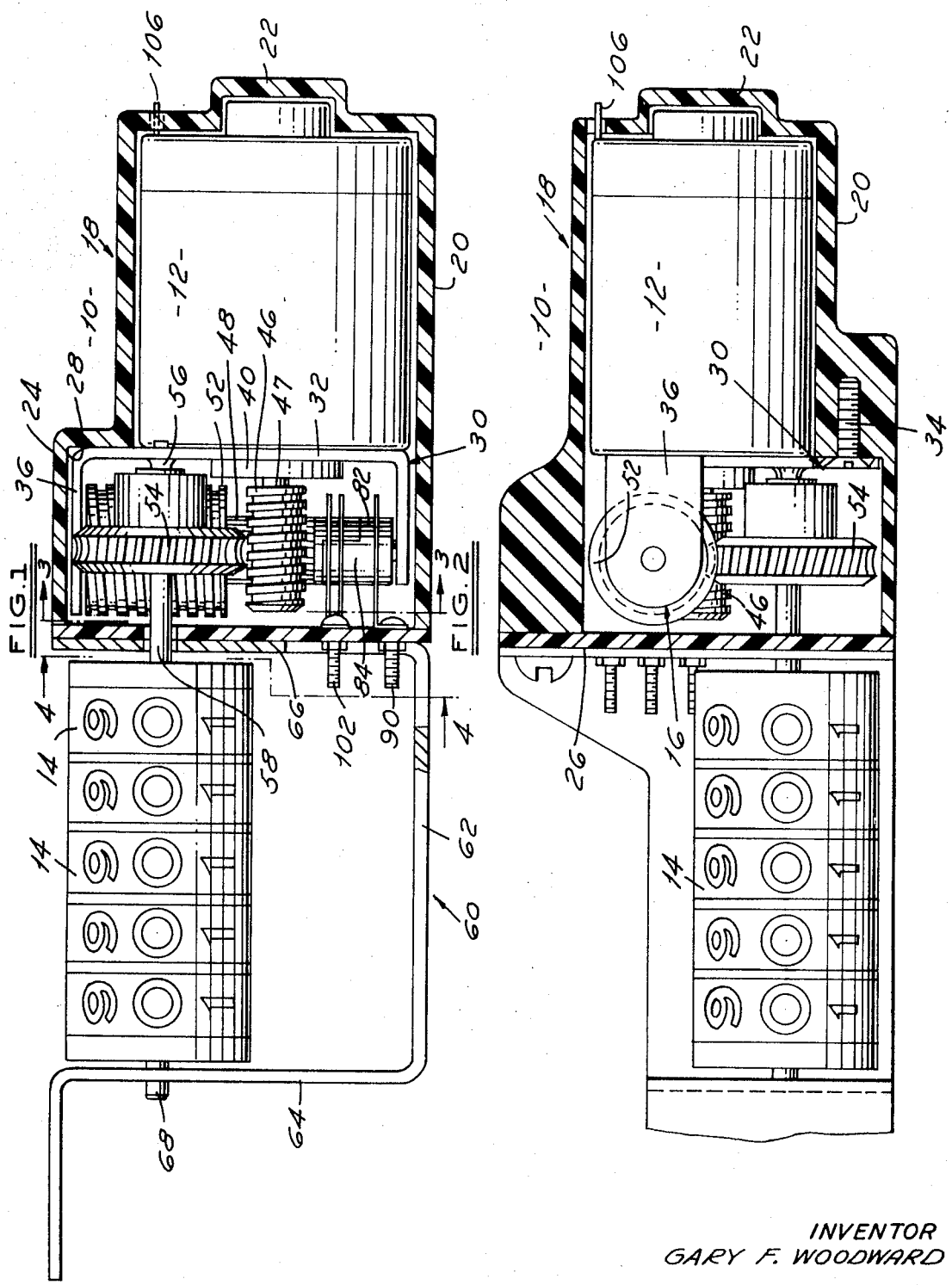
INVENTOR
GARY F. WOODWARD
BY John R. Faulkner
Keith L. Zerschling
ATTORNEYS Patented May 2, 1972

INVENTOR
GARY F. WOODWARD
BY
John R. Faulkner
Keith L. Zerschling
ATTORNEYS

Patented May 2, 1972
3,659,780
3 Sheets-Sheet 3
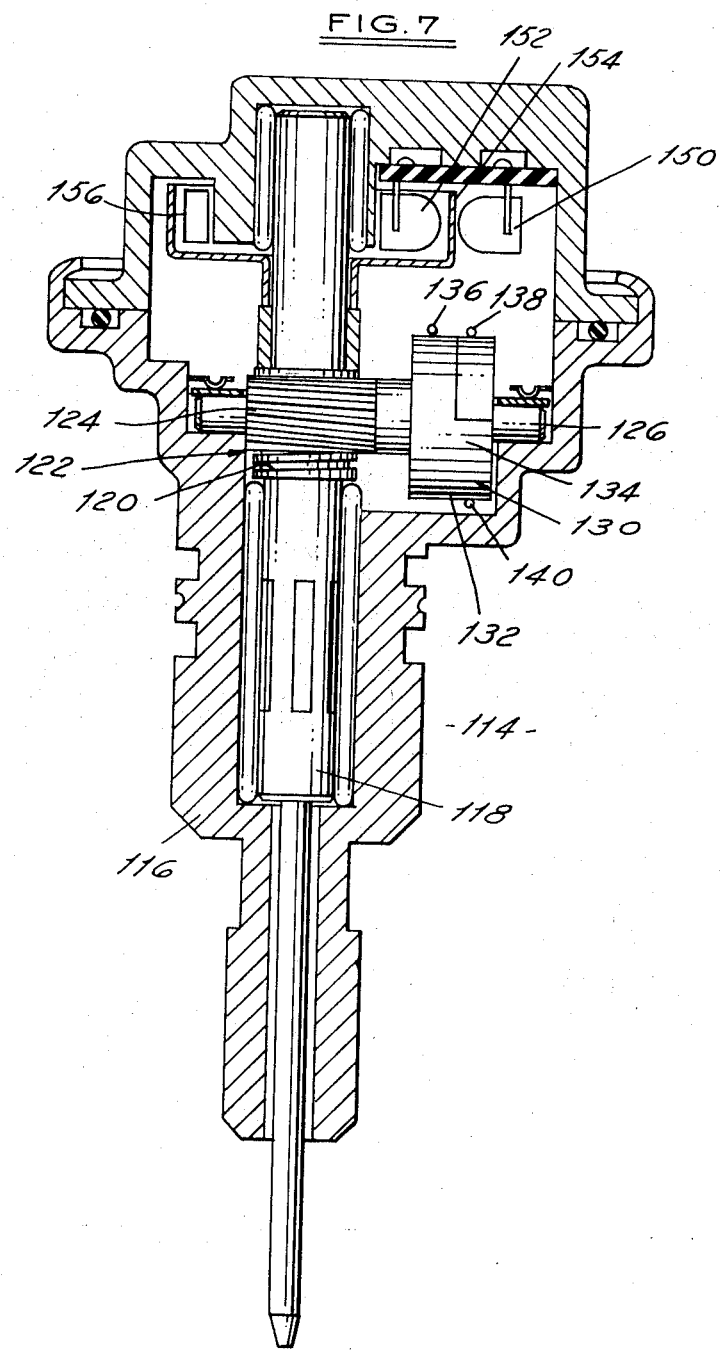
INVENTOR
GARY F. WOODWARD
BY
John R. Faulkner
Keith L. Zerschling
ATTORNEYS

ELECTRIC ODOMETER DRIVE

BACKGROUND OF THE INVENTION

This invention relates to electrically operated odometers and more particularly to an electrically operated odometer for an automotive vehicle that is driven by a small permanent magnet motor through reduction gearing and has very low noise characteristics.

Electrically operated odometer systems are known which consist of a solenoid ratchet or stepper motor which drives the odometer rolls. The solenoid ratchet or stepper motor is provided with pulses of electrical energy from the source of electrical energy through certain switching mechanisms driven by a portion of the vehicle that rotates at a speed proportional to vehicle speed. These systems have very low output torque and, hence, are subject to malfunction and binding of the odometer rolls due to the mechanical tolerances associated with the manufacture of the rolls and other associated mechanisms. In addition, these electrically operated odometer systems are generally noisy in operation and are therefore objectionable to operators of automotive vehicles.

In addition, certain other electrically operated odometer systems are known in the art, but these all suffer from high noise characteristics and hence are objectionable for use in automotive vehicles.

The present invention provides a very silent and noise free electrically operated odometer which has high output torque characteristics and is easily and inexpensively manufactured and assembled.

SUMMARY OF THE INVENTION

The invention provides an electrically operated odometer including an electric motor preferably of the small permanent magnet type. This electric motor drives a plurality of odometer rolls through reduction gearing which preferably is comprised of two series coupled worm and worm gear sets. A plastic housing encloses the electric motor and the reduction gears to provide low noise characteristics for the system.

In the preferred form of the invention a metal frame member is positioned within the plastic housing between the electric motor and the reduction gears. Means are coupled to the electric motor and to the frame for supporting the motor from the frame in a cantilever fashion from one end of the motor, and the housing is spaced from the motor at all other locations.

In addition, a commutator switch arrangement is carried by the reduction gearing. This commutator switch arrangement has contacts engaging the commutator and connected in circuit with the electric motor. A source of electrical energy is connected to the motor and the motor is in turn connected to this commutator. A switching arrangement preferably in the form of a similar commutator is driven by a rotating part of the vehicle that rotates at a speed proportional to vehicle speed. These switches are operated at the same speed and sequentially energize the motor with pulses of electrical energy.

The reduction gearing is supported by the frame member mentioned above and the reduction ratio is preferably very high, for example, on the order of 500 to 1, so that the odometer rolls are driven with a very high torque. In addition, with the use of the two sets of worm and worm gears connected in series, the system stops almost instantaneously (no overrun) when the motor is de-energized.

Thus, the present invention provides an electrically operated odometer which has very low noise characteristics and overcomes one of the principal objections found in prior art electrically operated odometer systems. In addition, the present invention provides very high torque on the odometer rolls by virtue of the use of very high ratio reduction gearing. In the preferred form of the reduction gearing, i.e., two sets of worms and worm gears in series, the system and odometer rolls stop almost instantaneously when the power to the electric motor is terminated.

With the switching of the motor periodically to energized and de-energized states, the high pitched noise associated with high speed electric motors is not present except at very high automobile vehicle speeds. At these speeds the other vehicle noise, such as, road and wind noise, is sufficiently high that this high speed whine is masked and is not objectionable.

The invention will now be described in connection with the attached drawings.

BRIEF DESCRIPTION OF THE DRAWINGS

FIG. 1 is a top plan view partially in section of the electrically operated odometer of the present invention, FIG. 2 is a side elevational view, partially in section, of the electrically operated odometer of the present invention, FIG. 7 is a sectional view of the sender or sensor employed with the present invention.

DESCRIPTION OF THE PREFERRED EMBODIMENT

Figure 3:
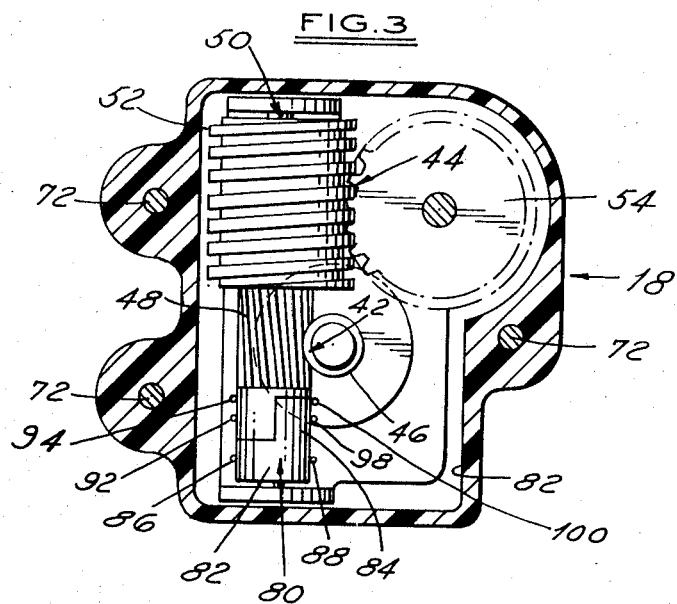
FIG. 3 is a sectional view taken along the lines 3—3 of FIG. 1.

Referring now to the drawings in which like reference numerals designate like parts throughout the several views thereof, there is shown in FIGS. 1 through 4 the electrically operated odometer 10 of the present invention which comprises generally a permanent magnet electric motor 12 connected to a plurality of odometer rolls 14 of conventional construction through reduction gearing 16. The permanent magnet motor 12 and the reduction gearing 16 are enclosed in a plastic housing 18 which includes a generally cup shaped portion 20 with an end wall 22. The inner dimensions of the cup shaped portion 20 of this plastic housing 18 are slightly larger than the outer dimensions of the permanent magnet motor 12 so that the motor may be positioned in spaced relationship to the cup shaped portion 20 as can best be seen by reference to FIGS. 1 and 3.

The end of the plastic housing 18 opposite the end wall 22 has an axially extending portion or wall 24 which is open at the end thereof. This end may be closed by a plastic end wall 26 to form an enclosed gear chamber 28 for enclosing the reduction gearing 16.

A metal frame member 30 has a generally flat body portion 32 secured to the plastic housing member 18 at a point intermediate the permanent magnet motor 12 and the rereduction gearing 16 by a plurality of screws, one of which is shown at 34. A pair of ears or tabs 36 and 38 extend perpendicularly from the flat body portion 32.

The permanent magnet motor 12 is supported in cantilever fashion from the body portion 32 of the frame 30 by means of a metal guide 40 which is suitably secured in an aperture positioned in the body portion 32 of the frame 30. The distance between the body portion 32 of the metal frame 30 and the end wall 22 of the plastic housing 18 is such that the end of the permanent magnet motor 12 opposite the metal frame 30 is positioned in spaced relationship to the end wall 22 of the housing 18 as can best be seen by reference to FIGS. 1 and 2.

The reduction gearing 16 comprises a pair of worm and worm gear sets 42 and 44 as can best be seen by reference to FIG. 3. The worm of the first worm and gear set 42 is designated by the numeral 46, and as can best be seen by reference to FIG. 1, this worm 46 is formed on the end of armature shaft 47 of the permanent magnet motor 12. The worm gear 48 of the first worm and gear set 42 is formed on a cross shaft 50 and this cross shaft 50 is rotatably supported through suitable bearings, in the ears or tabs 36 and 38 of the frame 30. This cross shaft 50 also has the worm 52 of the second worm and gear set 44 formed thereon.

The worm gear 54 of the second worm and gear set 44 is rotatably supported at one end from the body portion 32 of the frame member 30 by means of a journal or bearing 56. A shaft 58 extends from the other end of the worm gear 54 and it is employed to drive the odometer rolls 14.

The odometer rolls 14 are supported generally in a U-shaped metal frame or support structure 60 having a central portion 62 and a pair of legs 64 and 66 extending at right angles thereto. The odometer rolls 14 have a shaft 68 extending outwardly therefrom in alignment with the shaft 58 which is driven by the worm gear 54 of the second worm and gear set 44.

Figure 4:
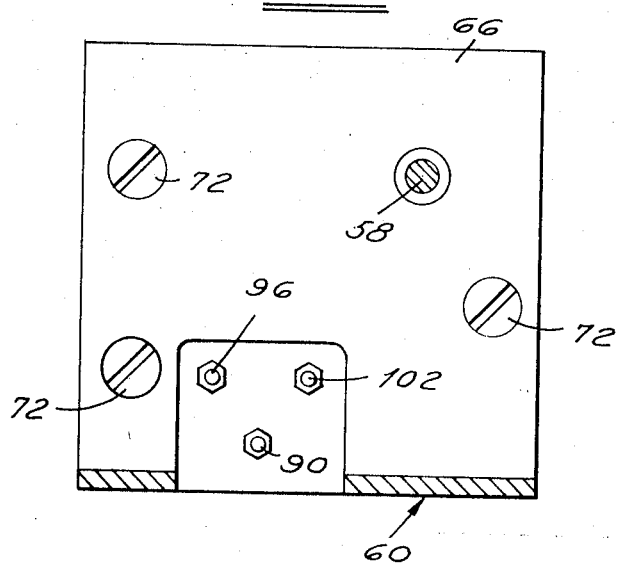
FIG. 4 is a sectional view taken along the lines 4—4 of FIG. 1.

The leg 66 of the metal frame 60 and the end wall 26 of the plastic housing 18 are secured to the plastic housing 18 by means of a plurality of screws 72 as shown in FIGS. 2, 3 and 4. A generally rectangular rubber insulator member (not shown) may be positioned between the end wall 26 of the plastic housing 18 and the leg 66 of the frame 60 for additional noise isolation purposes.

The worm 46 and the worm gear 48 of the first worm and gear set 42 as well as the worm 52 and the worm gear 54 of the second worm and gear set 44 are all formed of plastic material as is the balance or remainder of the cross shaft 50. It is to be understood, however, that the shafts that support these gears in the frame 30 may be formed of suitable metal and that these gears including the cross shaft 50 may be suitably affixed to these metallic shafts. This construction provides for a very silent operating gear set with minimum backlash and overrun.

Figure 5:
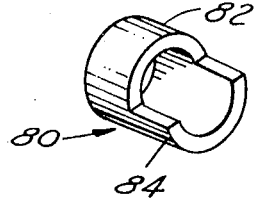
FIG. 5 is a perspective view of the commutator employed with the present invention.

A commutator 80 which is shown in perspective in FIG. 5 is positioned on an undercut portion of the end of cross shaft 50 opposite the worm 52 of the second worm and gear set 44 and adjacent the worm gear 48 of the first worm and gear set 42. This commutator may be in the form of a metal sleeve which has a first portion 82 formed in a complete cylinder and a second portion 84 formed in a partial cylinder, slightly more than one-half a cylinder. As a result when this commutator 80 is positioned on the plastic cross shaft 50 the full cylindrical portion 82 is positioned adjacent the ear or tab 38 of the metal frame member 30 as can best be seen by FIG. 2 and the partial cylindrical portion 84 is positioned adjacent the worm gear 48.

A pair of contacts in the form of wires 86 and 88 engage the full cylindrical portion 82 of the commutator 80 and these wires are in turn connected in parallel to a terminal 90. Two wire contacts 92 and 94 are connected in parallel to a terminal 96 and are positioned to engage the partial cylinder 84 of the commutator 80. Two other wire contacts 98 and 100 are positioned in opposed relationship to the two wire contacts 92 and 94 and these contacts are connected in parallel to a terminal 102. These two wire contacts 98 and 100 are also positioned to engage the partial cylinder 84 of the commutator 80.

Figure 6:
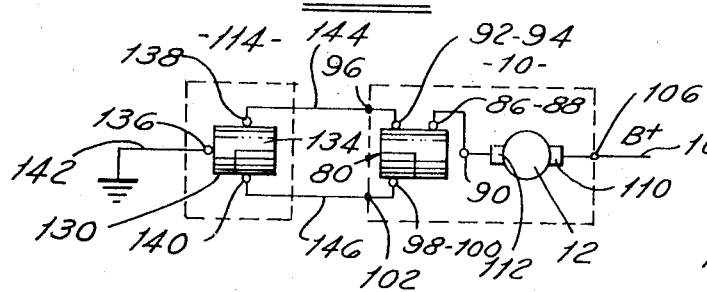
FIG. 6 is a circuit diagram of the electrical system employed with the present invention.

A source of electrical energy, preferably in the form of an electrical storage battery for the automotive vehicle utilizing the present invention has its positive terminal connected to a terminal 106 positioned in the permanent magnet motor 12. Referring now to FIG. 6, this source of electrical energy is designated by the symbol B+ and the positive terminal thereof is connected through lead 108 to the terminal 106 of the permanent magnet motor 12. The terminal 106 is in turn connected to an armature brush 110. The other armature brush 112 is connected to the terminal 90 which is adapted through wires 86 and 88 to be in constant engagement with the cylindrical sleeve 82 of the commutator 80. The stationary contacts 92-94 and 98-100 are shown on this drawing and through the partial cylinder 84 of the commutator 80, the contacts 92-94 and 98-100 are alternately connected to the contacts 84-86 and hence terminal 90 as the cross shaft 50 is rotated by means of the reduction gearing 16.

A sender 114, shown schematically in FIG. 6, is shown in cross section in FIG. 7. This sender comprises a housing 116 having a shaft 118 rotatably mounted therein. This shaft is adapted to be driven by a rotating part of the vehicle that rotates at a speed proportional to vehicle speed, for example, an output gear on the vehicle transmission. This shaft 118 includes a worm 120 of a worm and gear set 122. The worm gear 124 of the worm and gear set 122 is carried on a cross shaft 126 which is rotatably mounted within the housing 116. This cross shaft also has positioned thereon a commutator 130 which is similar in form to the commutator 80 positioned on the cross shaft 50 of the electrically operated odometer 10. This commutator includes a full cylindrical sleeve 132 and a partial cylindrical sleeve 134, less than one-half a cylinder. A wire contact 136 contacts the full cylindrical sleeve 132 and a pair of opposed wire contacts 138 and 140 engage the partial cylindrical sleeve 84 and the plastic material of the commutator 130.

As shown in FIG. 6 the contact 136 is connected to ground or the housing 116 through a lead 142, while contact 138 is connected to terminal 96 of the electrically operated speedometer 10 through a lead 144 and the contact 140 is connected to terminal 102 through a lead 146.

As stated previously, the reduction gear set 16 has a high gear reduction ratio or high speed reduction ratio coupled with its complementary high torque multiplication ratio. For example, the speed reduction ratio and the torque multiplication ratio of the reduction gear set 16 may be on the order of 500:1 to 750:1. As an example, the first worm and worm gear set 42 may have a speed reduction ratio and torque multiplication ratio of 10 to 1, while the second worm and worm gear set 44 may have a speed reduction ratio and torque multiplication ratio of 50:1 thereby providing an overall speed reduction ratio and torque multiplication ratio of 500:1. As disclosed, the speed reduction ratio of the worm and worm gear set 122 employed with the sender 114 is the same as the speed reduction ratio of the first worm and worm gear set 42 of the electrically operated odometer 10. This need not be the case, however, but it has been found that a speed reduction ratio of from 10:15 in the worm and gear set 122 works very well.

In operation, if it is assumed that the commutator 80 is positioned as shown in FIG. 6 so that the partial cylindrical sleeve 84 is in contact with the wire contacts 92 and 94, the permanent magnet motor 12 will be energized when the shaft 118 rotates sufficiently to bring the commutator 130 into the position shown in FIG. 6 where the partial sleeve 134 is in contact with the contacts 138. In this instance a circuit is completed from the source of electrical energy through the brushes 110 and 112 of permanent magnet motor 12, terminal 90, contacts 86-88, commutator 80, contacts 92-94, terminal 96, lead 144, contact 138, commutator 130, contact 136 and lead 142 to ground. This causes the permanent magnet motor 12 to rotate thereby rotating the reduction gearing 16 and driving the odometer rolls 14 at the speed reduction ratio of 500:1 in the example given At the same time the motor 12 drives the cross shaft 50 and the commutator 80 at a 10:1 speed reduction ratio. When the commutator 80 has been driven sufficient distance to bring the partial sleeve 84 out of engagement with the contacts 92, 94 the circuit is broken to the permanent magnet motor and the system will be de-energized. This will occur, of course, at the junction of the partial sleeve 84 and the plastic material located on the cross shaft 50 and the partial sleeve will be in engagement now with the contacts 98, 100. The shaft 118 will continue to rotate at the speed proportional to vehicle speed and will therefore continue to drive the commutator 130. When the partial sleeve 134 of the commutator 130 comes into contact with the contact 140 a circuit will again be completed through the permanent magnet motor from the source of electrical energy. In this instance, the circuit is completed through contacts 98, 100 on commutator 80, terminal 102, lead 146, contact 140, the partial sleeve 134 on commutator 130, commutator 130, contact 136 and grounded lead 142. The permanent magnet motor will then rotate for five revolutions until the partial cylindrical sleeve 84 comes out of contact with the contacts 98-100. This is true since the permanent magnet 12 makes 10 revolutions for every revolution of the commutator 80 due to the 10:1 speed reduction ratio of the first worm and worm gear set 42. At this time the motor will be de-energized and the contacts 92-94 will be in contact with the partial cylindrical sleeve 84. As the shaft 118 continues to rotate it will drive the commutator 130 until the partial cylindrical sleeve 134 of commutator 130 is again in contact with the contacts 138. A circuit through the permanent magnet motor 12 will then again be completed through the circuit previously described including contacts 92-94, terminal 96, lead 144, contact 138, commutator 130, contact 136 and lead 142 to ground.

The above cycle will repeat continuously as long as the shaft 118 of the sender 114 is rotated by the automotive vehicle. The duty cycle of the pulses of electrical energy applied to the electric motor 12 and hence the duty cycle of the electric motor increases as a function of vehicle speed.

The timing of the commutator 80 and its associated contacts 98-100 and 92-94 is much faster than the timing of the sender or speed sensor 114 comprised of the commutator 130 and the associated contacts 138 and 140 so that at all speeds of the automotive vehicle the commutator 80 and its associated switching structure leads the commutator 130 and its associated switching structures. Consequently, the commutator 130 of the sender 114 always completes the circuit to energize the motor 12, and the commutator 80 of the electrically operated odometer 10 always breaks the circuit to de-energize the motor 12.

Although forming no part of the present invention, the sender 114 may have associated therewith a photocell 150 and a light emitting device in the form of a light emitting diode 152.

A shutter 154 in the form of an open ended cylinder is affixed to the shaft 118 and is positioned betwen the photocell 150 and the light emitting diode 152. This shutter has a plurality of apertures 156 positioned therein. As the shaft 118 rotates at a speed proportional to vehicle speed the photocell is alternately energized and de-energized from the light emitting diode 152 as the apertures 156 pass between them. The output from the photocell is therefore a waveform having a frequency which is proportional to vehicle speed. This signal may be suitably processed to provide a readout of vehicle speed in a display device positioned on the instrument panel and in close proximity to the odometer rolls 14 of the present invention.

It can be readily appreciated from the above description and examination of the drawings that the permanent magnet motor 12 and the plastic reduction gearing 16 are completely enclosed within the plastic housing 18 and that the permanent magnet motor 12 is spaced from the plastic housing 18 over substantially all of its periphery. This construction prevents noise both in the permanent magnet motor and in the reduction gearing from being transferred outside the housing 18 where it could be heard by the vehicle operator. In addition, the present invention provides a very high torque multiplication gear set which will provide very high torques on the odometer roll thereby facilitating easy operation and less jamming of these rolls than is known in current low torque odometer systems. Moreover, because of the two worm gear sets connected in series, the odometer rolls will stop almost instantaneously with no overrun when the power to the electric motor is terminated. This particular feature allows the system to be operated in the pulse mode type of operation described above through any normal vehicle speed including speeds up to 150 miles per hours.

I claim:

1. An electrically operated odometer comprising, an electric motor, a plurality of odometer rolls, reduction gears coupling said electric motor to said odometer rolls, a plastic housing enclosing said electric motor and said reduction gears, a metal frame member positioned in said housing between said electric motor and said reduction gears, said reduction gears including a pair of worm and worm gear sets connected in series, said electric motor including an armature shaft extending through said frame, the worm of said first worm and gear set positioned on said armature shaft, a cross shaft rotatably mounted in said frame, said cross shaft having the worm gear of said first worm and gear set and the worm of said second worm and gear set positioned thereon, said odometer rolls having an odometer shaft extending in parallel relationship to said armature shaft, one end of said odometer shaft rotatably mounted in said frame, the worm of said second worm and gear set positioned on said odometer shaft, and means coupled to said electric motor and said frame for supporting said motor from said frame in cantilever fashion from one end of said motor, said housing being spaced from said motor at all other locations.

2. The combination of claim 1 in which the speed reduction ratio of said pair of worm and worm gear sets is in the range of about 500:1 to 750:1.

3. The combination of claim 1 and comprising further a commutator carried by said cross shaft and contacts engaging said commutator and connected in circuit with said electric motor.

4. The combination of claim 3 in which said commutator includes means energizing said motor during each half revolution of said cross shaft.

5. The combination of claim 1 in which said plastic housing has a generally cup shaped portion with an integrally formed end wall receiving said electric motor, the inner dimension of said cup shaped portion being slightly greater than the outer dimension of said electric motor and the length of said cup shaped portion being slightly greater than the length of said electric motor.

* * * * *